Feb. 3, 1970  E. W. DONATH ET AL  3,493,864
TAUT BAND SUSPENSION ASSEMBLY FOR METERS
Filed Aug. 10, 1967  4 Sheets-Sheet 3
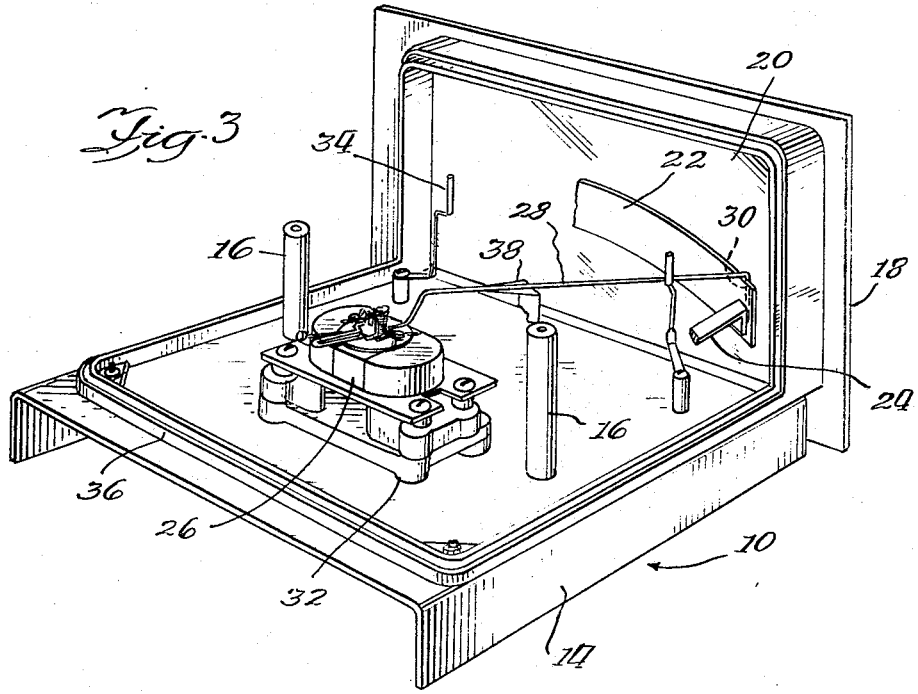
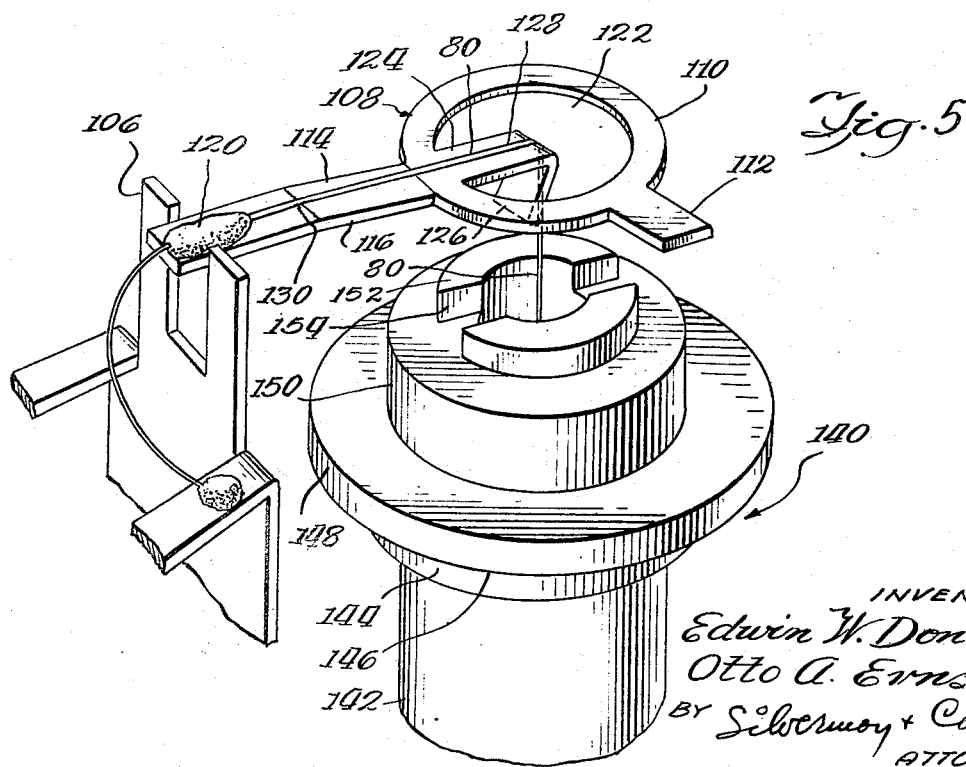
INVENTORS
Edwin W. Donath
Otto A. Ernst
BY Silverman + Cass
ATTORNEYS

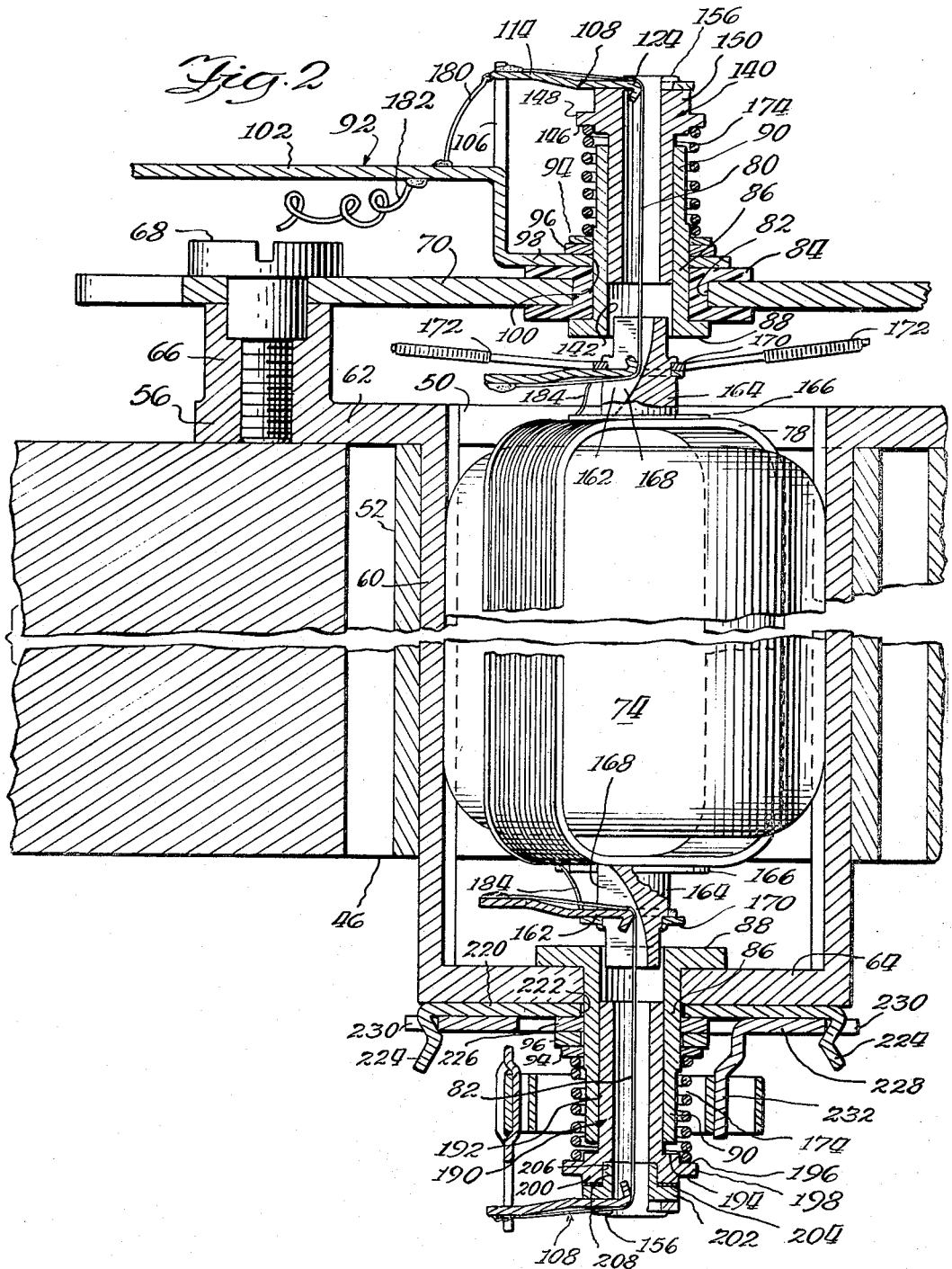

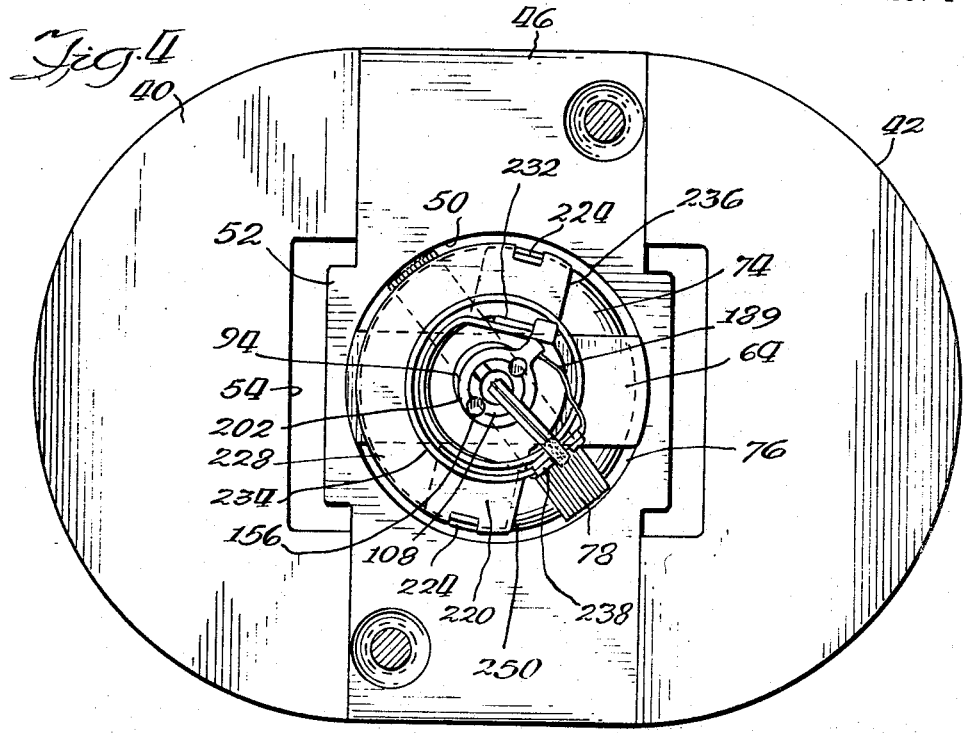
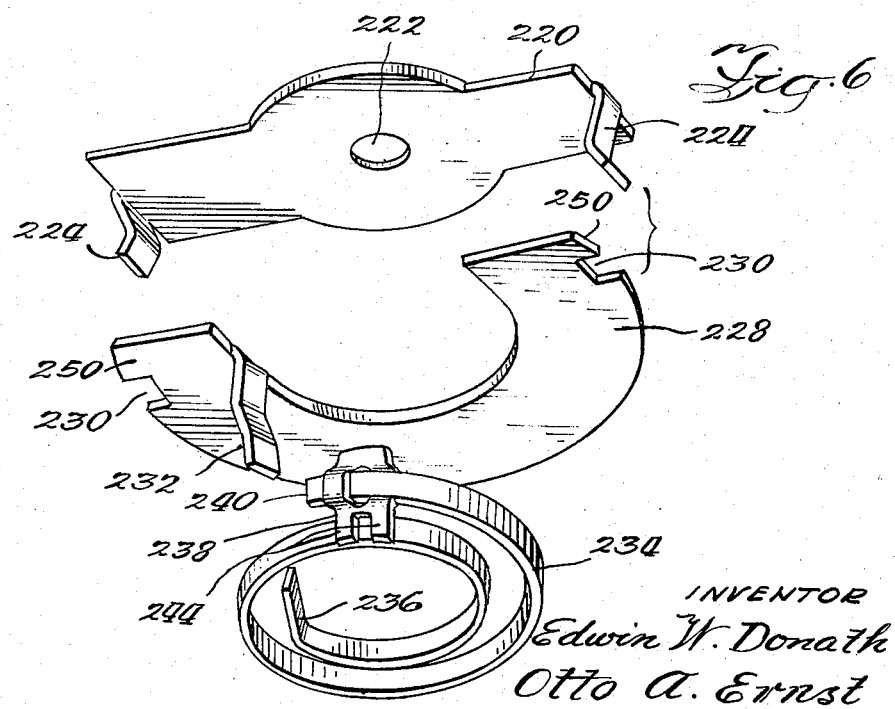

United States Patent Office 3,493,864
Patented Feb. 3, 1970

3,493,864
TAUT BAND SUSPENSION ASSEMBLY FOR METERS
Edwin W. Donath, Arlington Heights, and Otto A. Ernst, Mount Prospect, Ill., assignors to Alnor Instrument Company, Division of Illinois Testing Laboratories, Inc., Chicago, Ill., a corporation of Illinois
Filed Aug. 10, 1967, Ser. No. 659,711
Int. Cl. G01r 1/00, 1/16, 1/20
U.S. Cl. 324—154                                                                 21 Claims

ABSTRACT OF THE DISCLOSURE

A taut band suspension meter in which the outer filament anchor is mounted on the end of a hollow piston which is telescopically slidable within a hollow cylinder that is mounted on the meter frame so that the filament passes coaxially through the piston and cylinder and is anchored at its inner end to the swinging member, such as a galvanometer coil, the tension being applied to the filament by means of a relatively large helically coiled spring of cylindrical configuration surrounding the outer wall of the cylinder and being confined between the frame and a suitable flange formed on the piston on that part which protrudes from the cylinder, there being two such arrangements at opposite ends of the coil. The spring is mounted in a novel manner to maintain its accurate positioning. The disclosure also describes a cold end compensator structure associated with one of the filament mountings and removably secured in a clip which mounts to the frame so that any bi-metal unit representing a particular range of temperature compensation may be installed during manufacture enabling the same basic galvanometer to be used for all temperature ranges in building pyrometers, merely substituting different bi-metal units for the respective ranges. The upper and lower movement assemblies are held together by split rings of commercial variety.

Cross reference to related application

The invention herein applied specifically to an air velocity measuring device is disclosed and claimed in a co-pending application Ser. No. 659,710 filed Aug. 10, 1967 concurrently herewith by the applicants herein and another, entitled "Air Velocity Measuring Apparatus," now Patent No. 3,463,003." Both applications have a common assignee.

Background of invention

The invention relates generally to meters, such as galvanometers, in which a central structure such as a coil is mounted for swinging movement and carries a pointer moving over a scale, the central structure being mounted by filaments or fibres, stretched tautly between anchors. In the case of a galvanometer, when electric current is passed through the coil, through suitable electrical connections made with an outside circuit, the resulting magneto-motive force generated in the wires of the coil combine with the magnetic field to deflect the coil by a distance which is a function of the amount of current flowing. Such instruments are known as taut-band suspension galvanometers and are used in a manner which is well known. In the case of other instruments, such as for example, an air velocity measuring device, a vane is secured by an arcuate arm to a post, which in turn may be mounted by a taut-band suspension. Such meters have used only jewel-bearing suspensions, so far as is known.

The advantages of the taut-band suspension meter over the conventional jewel-bearing type of meter are well known, and need not be repeated. Certain disadvantages of the known types of taut-band suspension galvanometers are cured by the invention.

As for the use of the taut-band suspension in other meters, the same advantages obtain, together with additional functions.

One important object of the invention is to provide a taut-band suspension in which the filaments are mounted in a telescoping combination of piston and cylinder which has a helically coiled spring of relatively large diameter on the exterior of the cylinder whereby to provide a high degree of ruggedness to the mounting without sacrificing sensitivity, while at the same time assuring accurate disposition of the filament under all conditions.

In connection with the last-mentioned advantage, the actual mechanical connection of the filament to the piston which carries the same is effected by means of a robust and durable anchor presenting a short, stiff guide to the axis of the piston along which the filament extends. This construction is possible because the anchor is not required to provide any of the resilience for the stretching of the filament or for absorbing the shocks which can occur during use. Instead, the entire piston with the anchor is biased outward of the cylinder by the large spring which may maintain its tension at a substantially constant value over a wide range of conditions.

Prior filament mountings which have been used as a general rule provided the required resilience in the anchor for the filament, so that small members were required to provide at least the functions of securement of the filament and the resilience. Resilience is achieved by tempering suitable metal mountings, and since these were required to be made of relatively thin metal, difficulty was met in producing suitable mountings that could suspend the filament precisely and flex during shock or use without shifting the coil. The resulting difficulties need not be discussed at length, but among them were non-uniformity in response and often touching of the galvanometer coil against the inner walls defining the magnetic gap.

The structure of the invention achieves an advantage in that the coil used is of relatively large size and hence easy and economical to make, while being able to retain uniformity and accuracy. The invention has this advantage as an object, and additionally has as a concurrent object the provision of a novel method for mounting the spring so that it is accurately positioned and so that there is no interference of the spring with other parts of the structure during use.

The invention is principally intended for use in connection with pyrometers, and the structure taught by the invention enables certain advantageous structures to be used which are especially adaptable for pyrometers. One such structure is a novel method of mounting a temperature compensating coil, using a two-piece piston, with the filament mounted to a cap on the piston end capable of being rotated independently of the piston so as to avoid applying any twisting moment to the spring. The other structure is a novel form of anti-friction means between the piston parts.

Other objects are concerned with the provision of structural details, including an assembly arrangement using a frictionally engaged split ring of a commercially available type.

The prior art

The art of taut-band suspension galvanometers is well-known, and extends over a wide period of time. The early fibres were fragile and could not withstand high tensions needed to achieve accurate and sensitive movements, especially without concern as to the disposition of the axis of the movement of the coils. For example, a horizontally disposed coil in the very earliest of fibre suspensions would sag, rendering the galvanometer useless. Some of the early structures are shown in U.S. Patents 800,873 issued to E. F. Northrup, Oct. 3, 1905 and 870,803 issued to C. B. Thwing, Nov. 12, 1907, for example. Later examples are shown in Swiss Patent 232,655 of Sept. 1, 1944 and Great Britain Patent 433,080 of Aug. 8, 1935.

The art developed for a considerable period of time in the direction of galvanometers capable of substantially greater arcs of movement than the jewel-bearing movements using short filaments of high tensile strength and excellent recovery properties, so that substantial twisting would not produce permanent setting of the fibres and change the zero position of the pointers. The metals of such filaments are natural developments of the metal technology of the past twenty years or so. Several patents which illustrate the general type of movement, and specifically show the anchoring structure which the invention is especially intended to eliminate are French Patent 1,114,189, and U.S. Patents 2,716,680, 3,090,007, 3,111,-623 and 3,325,734, the last-named patent being owned by the assignee of the present application.

Prior structures using helically coiled spring mountings for suspension of the filaments have utilized such springs internally of telescoping members, instead of externally. So far as known, no commercial structures using such arrangements have remained on the market, and the reasons are believed to be generally the difficulty of producing such springs small enough to be enclosed while providing the proper ranges of tension for modern short fibres without canting or deflecting; the problem arising of rubbing of the springs on the walls of the telescoping members; the difficulty of assembling the structure and the complexity caused by confining such small springs. Certain advantages of the invention could not be achieved by the prior art due to the internal piston, the internal and confined springs, the absence of a piston cap protruding, and/or the inefficiency of the spring mounting.

With respect to other meters, the taut-band suspension is not believed to have been used successfully. The specific piston-cylinder-spring structure is not known to have been used on such other meters.

The invention will be described particularly in connection with its use in a galvanometer. Such use is by way of example only, insofar as the suspension *per se* is concerned, and the claims therefor will not all be so limited.

General summary of the invention

Generally the invention comprises a structure for mounting the filaments of a taut-band suspension galvanometer in which there is a frame having a cylindrical member secured at the top and bottom thereof, a central coil suspended in the circular gap of a magnetic core and having filaments or fibres secured to its top and bottom respectively, extending through suitable openings in the frame coaxially of the cylindrical members. Each cylindrical member has a centrally disposed piston which is capable of reciprocating therein, and each piston has an end cap to which the free or outer ends of the respective filaments are mounted by means of suitable anchors. The anchors are rugged in each case and have short cantilever projections extending to the axis of the respective pistons, with the filaments properly positioned on the ends of said cantilever projections.

Each of the piston end caps includes a flange and a helically coiled spring is arranged coaxially of the cylinders on the exterior thereof, with one spring end seated against the frame and the other against the respective flange of the pistons, each spring being in close engagement with its respective end mounting, but preferably being spaced from the wall of the cylinder which it surrounds. The cylinders may be provided with reduced diameter portions between their respective ends for this purpose.

The lower piston is formed in two parts, the end cap being separate from the body of the piston although coaxially coupled therewith, so that the end cap is capable of rotation independently of the piston body and hence independent of the spring which urges the piston out of its cylinder. There is a member of anti-friction material between the end cap and body. A temperature compensating bi-metal member of spiral configuration is mounted generally coaxially of the lower assembly of piston and cylinder, being removably secured to the lower frame by means of a clip which holds it in place. The end of the spiral member is connected to the lower end cap to rotate the end cap in response to temperature changes, and since the lower end cap has the lower anchor for the lower filament, this provides the temperature compensation normally needed for pyrometers.

The upper and lower assemblies of the galvanometer movement are held together by split rings, such as available commercially as "Tru-arc" rings, providing simplicity and economy of construction.

Description of figures

FIG. 2 is a fragmentary sectional view through the same.

FIG. 3 is a rear perspective view of the galvanometer with its housing removed and certain support structures not shown.

FIG. 4 is a fragmentary bottom plan view of the galvanometer movement.

FIG. 5 is an enlarged, fragmentary, exploded view of a portion of the upper assembly of the galvanometer movement.

FIG. 6 is an exploded view of the temperature compensation means secured to the bottom of the galvanometer movement.

Drawing attention to the illustrations, the galvanometer 10 is of generally conventional construction but for the suspension, temperature compensating means, and method of assembling the upper and lower ends. In FIG. 3 there is illustrated, from the rear a galvanometer constructed in accordance with the invention although the details are not as apparent as in other views. There is illustrated a sheet metal chassis 14 which is normally covered by a boxlike housing which is not shown, this housing engaging over the top of the entire structure and being held in place by suitable standards shown generally at 16. To the front of the chassis 14 there is secured a framing member 18 which has a sight glass 20 through which a suitable scale illustrated at 22 may be seen. The scale is mounted in any conventional manner such as, for example, by brackets, a fragment of which is illustrated at 24. The galvanometer movement generally is designated by the reference character 26 and the pointer arm 28 driven by the movement 26 has its end 30 bent at an angle to the arm 28 so that it may pass over the arcuate scale 22 and cooperate with suitable indicia printed on the front of the scale 22 and calibrated to read units representing the characteristic being measured by the galvanometer 10.

Figure 1:
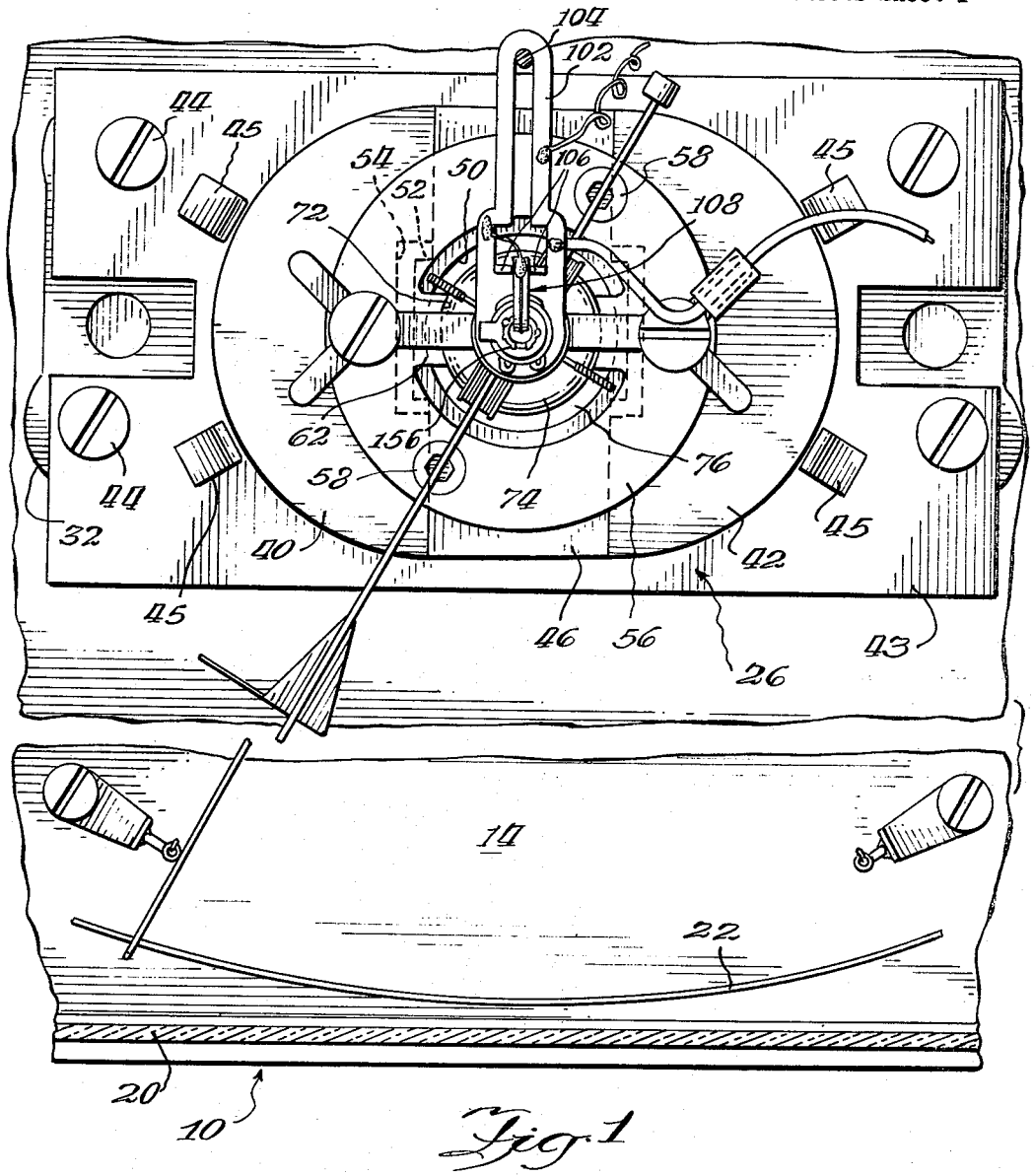
FIG. 1 is a fragmentary top plan view of a galvanometer constructed in accordance with the invention.

Illustrated in FIG. 3 is a block 32 upon which the galvanometer movement 26 is mounted. Bumpers 34 are secured to the top of the chassis 14 for limiting the movement of the arm 28, and a fragment of gasketing material 36 is shown, to render the galvanometer dust tight when its housing is in place.

The arm 28 may have a vane or other means 38 cooperating with some control device (not shown) so that, in addition to indicating quantities, the galvanometer 10 may be used for controlling the power input of a furnace or the like.

In FIG. 1, the galvanometer movement 26 is shown in some detail from the top thereof. A pair of semi-cylindrical magnets 40 and 42 are shown mounted on the brass plate 43 which in turn is secured to the platform 32 by suitable screws 44. Lugs 45 locate the magnets properly.

The platform 32 is of insulating material and it spaces the entire movement 26 above the top of the chassis 14. The magnets 40 and 42 have a center pole piece 46 of soft iron which is retained in magnetic relationship so that the flux within which the coil rotates is rendered uniform. Said member 46 has a central, vertical bore 50 which is substantially the same diameter as the width of the member 46 and so that an outwardly offset portion 52 of the member 46 is provided on each side of the bore physically to strengthen the member 46. Each of the magnets 40 and 42 has a cutout at 54 to accommodate such extensions 52.

An annular ring 56 of bronze or other non-ferrous material is mounted on top of the magnetic member coaxially aligned with the bore 50 to form the frame for the galvanometer movement and support the delicate mechanism thereof. The ring 56 is held in place by suitable screws shown at 58 and has a pair of juxtaposed arms 60 integral therewith and extending axially through the bore on opposite sides thereof, there being a pair of opposed radial webs 62 extending from the ring over the bore 50 to provide such connection. At the bottom ends of the arms 60 there is a transverse support portion 64 which serves as a part of the frame to mount the lower part of the galvanometer movement, as will be explained. The ring 56 has a pair of integral posts 66 disposed on opposite sides of the ring at the same location as the web parts 62, these being internally threaded to receive the screws 68 by means of which a bridge 70 is secured between them.

It will be seen in examining FIG. 1 that the arms 60 have their inner surfaces arcuate, as shown at 72, and such arcuate surfaces retain between them cylindrical core 74 also of soft iron. Parallel arms 60, besides frictionally retaining the core 74, serve as stop members to limit rotation of the galvanometer coil.

The soft iron pole piece 46 and the soft iron core 74 are provided to assure a uniform distribution of flux across the resulting gap 76 which is formed between the bore 50 and the core 74. A rectangular coil of wire mounted on a suitable light metal frame provides the rotating member for the galvanometer movement 26. The coil is designated 78, and in the particular movement, the coil is suspended, as will be described, between an upper filament 80 and a lower filament 82, these filaments being under tension and defining the axis of rotation for the coil 78 within the gap 76.

As thus far described, the galvanometer 10 is substantially conventional, and the specific structure described is therefore a matter of design preference. For the most part, the structure which will be described hereinafter is believed novel.

The bridge 70 is considered to be a part of the galvanometer frame. It has a central opening 82 within which there is disposed a washer or other member or members 84 of synthetic resin. This member 84 insulates the bridge 70 from the upper assembly of the galvanometer movement 26. The upper assembly comprises a metal cylinder 86 having a lower flanged end 88 engaging the bottom of the insulating member 84 and having a reduced diameter portion at 90. A zero adjustment lever 92 is mounted above the insulating member 84 and held in place by a washer 94 and a resilient split ring 96. No other securement means are necessary since the split ring 96 is frictionally engaged upon the cylinder 86. The split ring preferably is of a type known as "Truarc."

The lever 92 has a part 98 provided with a central bore 100 that engages on the cylinder and there is an offset arm 102 which is slotted, as best shown in FIG. 1, so that it may be engaged by a pin 104 carried on an eccentric screw normally mounted in the cover of the housing (not shown). A pair of upwardly extending arms 106 integral with the level 92 straddle the suspension clip 108 from which the filament 80 depends.

Looking now at FIG. 5, the suspension clip 108 is an integral robust structure preferably formed of beryllium copper which has been spring tempered. There is an annular ring 110 having a terminal tab 112 preferably provided on one side thereof and having an integral arm 114 provided on another side. The arm 114 will be arranged with a bend 116 therein and the filament 80 is silver-soldered at 120 to the end of the arm 114. In FIG. 5 fragments of the upstanding fingers 106 are shown to indicate the manner in which said arm 114 is straddled for zero adjustment. Obviously movement of the lever will swing the entire clip 108 about the filament axis.

The annular ring 110 is formed with a central opening 122 and has a radial cantilever extension 124 aligned with the arm 114 terminating at the center of the opening 102 and bent downwardly and inwardly at an angle as shown at 126. The extension 124 is preferably grooved at 128 properly to seat the fiber or filament 80 and likewise there may be a groove 130 coined in the metal at the bend 116.

A piston member 140 is telescopically engaged within the hollow bore 142 of the cylinder 86 and is arranged for reciprocating movement therein. It may be lubricated for ease of motion. The piston 140 includes a hollow, cylindrical body 142, an enlarged portion 144, a shoulder 146 provided on the lower edge of a flange 148 and an upper cap end 150 having a protrusion 152 that is split into two halves by suitable grooves 154 formed therein. The piston 140 which is associated with the upper portion of the galvanometer movement 26 is integral and may be formed as a screw machine part. The clip 108 is assembled to the piston by seating the ring 110 upon the enlarged portion 150 with the protrusion halves 152 extending into the opening 122 and the radial cantilever extension 124 engaging in either one of the grooves 154. When this association has been achieved, the upper ends of the protrusion halves 152 are staked or swaged over the inner edges of the ring 110 upon top of the ring as shown in FIGS. 1 and 4 at 156. In this form the piston and its clip may be assembled to the cylinder 86. Any suitable technique for assembling may be used.

The bottom end of the filament 80 is attached to an anchor 162 of construction quite similar to the construction of the clip 108, this anchor being mounted on a post 164, the legs 166 of which are cemented or otherwise attached to the coil 78. A slot 168 in the post provides the necessary clearance and the ring 170 which conveniently may mount the balancing arms 172 secures the clip 162 in place in any suitable manner, such as, for example, by staking, cement, and the like.

When the structure as described is assembled, a helically coiled spring 174 is mounted surrounding the reduced diameter portion 90 of the cylinder 86. The bottom end of the spring seats upon the washer 96, and the upper end of the spring engages the shoulder 146 so that the spring may be substantially clear of the wall of the cylinder and is accurately and firmly seated. As will be noted, the diameter of the spring is greater than the diameter of the cylinder and hence the spring may be made accurately and with relatively great tension. The spring is normally extended and, when assembled, is compressed, thereby placing the filament 80 under relatively high tension. At the same time if any shock occurs, such shock is readily absorbed by the spring 174. The clips 108 and 162 may be made of metal which is of relatively heavy gauge so that there need be no flexing of the cantilever extensions such as the extension 124.

An electrical connection 180 is shown between the arm 114 and the lever 92 so that any strain on the resulting lead wire 182 will be taken by the large lever 92 instead of clip 108. There is a second electrical connection at 184 from the lower clip 162 to the coil 78.

Looking now at the lower portion of the galvanometer movement 26, it will be appreciated that the brass support plate 43 has a suitable perforation to enable the bottom of the movement to protrude, and likewise that the block 32 is formed to avoid interference with the bottom assembly. This structure is not illustrated in the drawings.

The transverse support portion 64 may be termed the lower bridge to distinguish it from the upper bridge 70, although as will be appreciated, the lower bridge 64 is integral with the ring 56. It is also a part of the frame as defined in the specification herein and as referred to in the claims. The mounting of the lower assembly of the galvanometer movement 26 is quite similar to that which has been described as the upper assembly with two important differences which relate primarily to temperature compensation. Similar reference characters conveniently may be applied to some of the same parts of their equivalents. Thus, the components identified and described above as the cylinder 86 with its flanged end 88, having the reduced diameter portion 90 the post 164 with the legs 166 and slot 168; the connection 184; the split washer 96; the washer 94; the anchors 162 and 108; the spring 174; the ring 170—all find equivalents in this lower assembly. In order to distinguish between the anchors insofar as relative disposition is concerned, instead of using the designation "upper" and "lower" as done thus far above, they will be referred to an "inner," meaning closer to the coil, and "outer" meaning further from the coil. Reference will still be made to upper and lower assemblies, and to upper and lower components which are readily located by such designations.

The lower cylinder 86 is not insulated from the lower bridge 64 and hence the coil 78 is grounded to the frame through the lower filament 82 and the other metal members of the assembly. Additionally a connection at 189 extends between the compensator member 234 and the outer suspension clip 108 of the lower assembly. The lower ring 170 differs from the upper ring in that no balancing arms and weights are shown attached thereto, although these may be utilized, if desired.

The construction of the lower piston member 190 is best shown in FIG. 2. The body of the piston member is 192 and like that of piston 140, has the enlarged portion 194 equivalent to the enlarged portion 144, and the shoulder 196 equivalent to the shoulder 146 formed on the flange 198. The end of the piston 190 is formed of two coaxial parts, a head 200 which is integral with the body portion of the piston 190 just described and an independent end cap 202 coaxially coupled with the head 200 but separated therefrom by a relatively thin washer 204 of anti-friction material so as to be independently rotatable. Preferably the head 200 has an internal annular socket 206 formed therein and the end cap has a mating male end 208 for cooperation. The washer may be formed of tetrafluoroethylene.

The outer configuration of the end cap 202, that is the lowermost face as viewed in FIG. 2, is quite similar to that of the outer end of the piston 140. It is provided with protrusion halves similar to those shown at 152 and grooves similar to those shown at 154. These are not illustrated in detail inasmuch as the view in FIGS. 2 and 4 represent the structure with the outer suspension clip 108 of the lower assembly secured in place by staking as at 156.

Referring now to FIGS. 2, 4 and especially FIG. 6, the galvanometer of the invention includes a novel temperature compensating structure. Such temperature compensating structure is not needed for galvanometers to be used for measuring direct electrical characteristics, but are required when the galvanometer is a part of a pyrometer including a thermocouple whose cold junction is not kept at constant temperature but is permitted to be maintained at ambient temperature. Meter calibration in such cases will change with change of ambient and hence it is required to utilize a bimetal member normally in the form of a spiral to apply an angular movement to the indicator needle proportional to the change in ambient temperature. The amount of angular change is a function of several factors, the most important of which are two in number (1) the temperature range over which the thermocouple is intended to operate and (2) the metals from which the thermocouple is made.

Each set of conditions requires a different temperature compensating device, and it has been customary to build the compensating means into the galvanometer during manufacture when designed to be used as a pyrometer. The manufacturer in the past has thus been faced with two alternatives which are to stock galvanometers for all of the ranges which might be ordered, or to build the galvanometers to order. Where hundreds of sets of different conditions might be met, it would be obviously be more economical to build the instruments to order, but the loss of time between order and delivery has forced some manufacturers to build and maintain large stocks of galvanometers to comply with those types of conditions most usually met. In any case, the arrangement was unsatisfactory, because it was expensive and time-consuming.

According to the invention, the same galvanometer movement is used for all conditions to be met, the cold end compensating means being readily clipped into place when any particular kind of pyrometer is being built. Dials are easily installed by simple fastening means so that orders can be filled from stock immediately. The compensating structures are all built well in advance of use and represent an insignificant investment compared to the money which would be required to stock complete galvanometers with the likelihood of not being called upon to furnish some which are rarely used. The efficacy of this arrangement will become more apparent from the specific description which follows.

While the invention enables the ready change of a galvanometer which has already been built to operate under a completely different set of conditions, the real saving of the invention is in the aspects of production. The galvanometer movements which the manufacturer stocks are all identical, and are all made with production techniques regardless of the conditions under which they will eventually operate. The adaptation to any predetermined set of conditions of use as a pyrometer requires additional construction details which require only a few minutes to effect.

As for the changes in the field, the compensating means can be removed and replaced in a matter of minutes without distributing the suspension assemblies of the galvanometer.

A plate 220 of elongate configuration and having a central perforation 222 and spring ears 224 at opposite ends is clamped to the lower face of the lower bridge 64 by the split ring 96 with an intervening washer 226. The perforation 222 enables the cylinder 86 to pass through the plate 220. This plate is a holder, and it is formed of spring-tempered phosphor bronze. It may be considered a part of the galvanometer movement that may be assembled with the movement irrespective of the temperature range over which the galvanometer will operate, although, as readily obvious, when the suspension assembly is taken apart it is an easy matter to remove the holder as well. Certainly it is a simple matter to assemble this element to the galvanometer.

A phosphor bronze horseshoe-shaped clip 228 is snapped into face to face engagement with the holder 220. This clip has a pair of outwardly opening notches 230 which align with and are engaged by the ears 224, and it also has an axially extending (i.e., relative to the axis of the cylinder and piston members which pass through the open portion of the clip) finger 232 integral therewith and positioned on an interior edge of the clip. A spiral compensator bimetal member 234 has its inner end 236 silver soldered or otherwise welded to the finger 232 as best shown in FIG. 4, and has a coupling link 238 of any suitable construction secured to its outer end 240. The link 238 in the galvanometer illustrated is formed of sheet metal and provides a passageway through its center with portions bent on opposite faces of the compensator member to enable it to be secured in place. An axially extending portion of the link provides a pair of fingers 244 which mechanically straddle the free end of the outer suspension clip 108 of the lower assembly. Movement of the end 240 caused by temperature changes will rotate the suspension clip 108 which in turn will apply a slight twist to the lower filament 82. The end cap 202 is free to move independently of the remainder of the lower assembly by reason of its anti-friction connection with the lower piston member 192. Obviously the upper assembly could be so constructed, in order to prevent any twisting of the spring during zero adjustment, but since the zero adjustment is manual this is not necessary. The temperature compensating movement of the filaments is with much less force, and resistance to such movement should be decreased.

To remove the compensator member 234 one slips the fingers 244 away from the compensator clip, and pries the horseshop-shaped clip 28 loose away from the ears 224. No other part of the galvanometer is disturbed. To replace, the narrow ends 250 of the clip 228 are inserted laterally into engagement with the ears 224 and pushed until the fingers engage the notches 230 or the clip may be forced into position by face-to-face pressure.

A consideration of the construction of the galvanometer will indicate a ruggedness which makes the device substantially shock-proof. The coil with its connected filaments and pistons is capable of axial movement to a degree not possible with either jewel-bearing mounted movements or taut-band suspension galvanometers where the tension is acquired through the use of leaf spring supports. Note that the forks 106 and 244 for zero adjustment and temperature compensation movement are slotted to enable such substantial axial movement.

As previously mentioned, the invention is not limited to galvanometers but applies equally as well to any kind of meter having a central suspended swinging member, and particularly reference has been made to an air velocity measuring device described in a co-pending application.

What it is desired to be secured by Letters Patent of the United States is:

1. In a taut-band suspension meter in which there is a structure defining an arcuate path, a support frame having parts at opposite axial ends of the path, a swingable members suspended between the frame parts and disposed for limited rotative movement along the path and a pointer connected with said swingable member for movement relative to a suitable scale, the invention herein which comprises:
    (A) a suspension assembly mounted to each frame part and each having a filament anchored thereto and extending coaxially of the path in alignment to respective axial ends of the swingable member,
    (B) at least one suspension assembly comprising:
        (i) a hollow cylindrical member mounted to one of said frame parts,
        (ii) a hollow piston mounted in said cylindrical member reciprocable therein,
        (iii) the piston having an end cap external of the cylindrical member,
        (iv) means anchoring the outer end of one of said filaments to said end cap, said filament passing through said piston coaxially thereof and being secured to said swingable member so that the axis of rotation of the swingable member is the axis of the piston and cylindrical member and is defined by said filaments,
        (v) said piston having a first spring seat external of said cylindrical member adjacent said end cap,
        (vi) said one frame part and cylindrical member having a second spring seat space from the first spring seat,
        (vii) and a helical coiled spring coaxial with said cylindrical member and on the exterior thereof extending between said seats and biased to force the seats apart to apply tension to said filaments.

2. The invention as claimed in claim 1 in which there is a second suspension assembly, said second suspension assembly being constructed according to paragraph (B).

3. The invention as claimed in claim 1 in which the said one frame part has a passageway which is coaxial with said filaments and the cylindrical member is secured within said passageway with a substantial portion thereof on the outside of the frame part extending in a direction away from said swingable member, and the piston is mounted in said cylindrical member with its end cap on that end furthest from said swingable member.

4. The invention as claimed in claim 2 in which the meter is a galvanometer, the swinging member is a coil and means are provided to insulate one of the cylindrical members from its frame part.

5. The invention as claimed in claim 3 in which said cylindrical member has a flange engaging the inside of the frame part, and a split ring frictionally engaging the cylindrical member on the outside of the frame part to secure said cylindrical member to said one frame part.

6. The invention as claimed in claim 1 in which said second spring seat is an annular member coaxial with said cylindrical member and engaging against said one frame part.

7. The invention as claimed in claim 1 in which said cylindrical member has a relatively short exterior portion thereof which is circumferentially engaged by the interior of said helical spring adjacent said second seat, but substantially the remainder of said cylindrical member is of reduced external diameter to clear said spring.

8. The invention as claimed in claim 1 in which said first seat is integral with said end cap.

9. The invention as claimed in claim 1 in which said end cap is independent of the remainder of the piston and capable of independent rotation relative thereto.

10. The invention as claimed in claim 9 in which the first seat is on said piston remainder.

11. The invention as claimed in claim 1 in which said anchoring means comprise a sheet metal member secured to said end cap and having an annular ring coaxial with said piston, and a stiff cantilever arm integral with said ring on the interior thereof, said one filament being secured to said sheet metal member and positioned and guided to its disposition coaxial of said piston by said cantilever arm.

12. The invention as claimed in claim 9 in which there is a mating connection between said end cap and the remainder of the piston maintaining the coaxial relationship between them, and an antifriction member disposed between engaging axial end surfaces thereof.

13. The invention as claimed in claim 1 in which said anchoring means comprise a suspension clip of sheet metal secured to said end cap and having an annular ring portion, a lateral external integral arm, an internal integral relatively stiff cantilever arm extending to the axis of said piston, said one filament being attached to said external integral arm and overlying said cantilever arm and being positioned by the end thereof along the axis of said piston.

14. The structure as claimed in claim 2 in which at least one of the end caps is independently rotatable relative to its connected piston.

15. In a taut band suspension galvanometer in which there is a magnetic circuit providing a cylindrical magnetic gap, bridging members at opposite axial ends of the gap, a rectangular coil mounted for rotation within the gap, each bridging member having a suspension assembly mounted thereon and each suspension assembly including an aligned filament having an inner end extending inwardly toward the coil and connected thereto, and an outer anchored end having tension means tending to pull the filament outwardly of the coil whereby to maintain the coil in taut suspension and rotatable on an axis defined by said filaments; means for providing the tension, comprising:
(A) a hollow cylindrical member mounted on each bridging member coaxial with the axis of said magnetic gap and filaments, and extending outwardly from said bridging member,
(B) a reciprocable hollow piston in said cylindrical member, said piston having an outer end of one filament connected thereto and passing into said piston coaxially thereof,
(C) the respective inner ends of the filaments being connected to the opposite axial ends of said coil,
(D) each piston having an enlarged outer end,
(E) a helical coiled spring extending between each enlarged end and the bridging member mounting the cylindrical member with which the piston having the respective enlarged ends is associated, said coiled spring being on the exterior of said last mentioned cylindrical member and tensioned to urge the enlarged ends away from one another.

16. The invention as claimed in claim 15 in which one of said enlarged ends has a lateral arm, there is a temperature compensating device mounted to the bridging member closest to said one enlarged end, and there is a link between said temperature compensating device and said lateral arm.

17. The invention as claimed in claim 16 in which the temperature compensating device is removably mounted to said last mentioned bridging member and said link is separable from said lateral arm.

18. A galvanometer for pyrometric use and which includes a magnetic circuit and means forming a cylindrical magnetic gap therein, a rectangular coil having a connected pointer adapted to rotate through said gap on an axis which is coaxial with the cylinder defined by the gap, first and second frame members at opposite respective ends of the gap, a filament suspension assembly mounted to each frame member and each having a filament anchored thereto spaced outwardly of the coil and extending toward and being connected to the coil at opposite respective axial end thereof whereby the coil axis and the line of the filaments are the same, each suspension assembly including means to maintain the filaments in tension, the invention herein which comprises:
(A) one suspension assembly having a rotatable member having a filament end attached thereto, said one suspension assembly comprising,
  (i) a cylinder secured to a frame member and having an interior reciprocable piston, the piston and cylinder both being hollow and coaxial with the axis of the coil and the line of the filaments,
  (ii) an exterior helical spring around the cylinder and engaging an end of the piston and pushing same outward, said piston having a body and an end cap, the said rotatable member comprising the end cap of said piston,
(B) a lateral arm on said rotatable member,
(C) the frame member to which said one suspension assembly is mounted having a first plate member,
(D) a temperature compensating device of generally spiral configuration mounted on a second plate member,
(E) the plate members having cooperative means for enabling them readily to be secured together in a firm but separable connection,
(F) the spiral compensating device being arranged generally in a plane normal to the coil axis but coaxial with the filaments,
(G) one end of the compensating device being fixed to said second plate member and the other being removably linked to said lateral arm whereby to rotate said member with change in ambient temperature to change the angular disposition of said pointer.

19. The galvanometer of claim 18 in which the said end cap is rotatable independently of the body of said piston.

20. A galvanometer for pyrometric use and which includes a magnetic circuit and means forming a cylindrical magnetic gap therein, a rectangular coil having a connected pointer adapted to rotate through said gap on an axis which is coaxial with the cylinder defined by the gap, first and second frame members at opposite respective ends of the gap, a filament suspension assembly mounted to each frame member and each having a filament anchored thereto spaced outwardly of the coil and extending toward and being connected to the coil at opposite respective axial ends thereof whereby the coil axis and the line of the filaments are the same, each suspension assembly including means to maintain the filaments in tension, the invention herein which comprises:
(A) one suspension assembly having a rotatable member having a filament end attached thereto,
(B) a lateral arm on said rotatable member,
(C) the frame member to which said one suspension assembly is mounted having a first plate member,
(D) a temperature compensating device of generally spiral configuration mounted on a second plate member,
(E) the plate members having cooperative means for enabling them readily to be secured together in a firm but separable connection, one of said plate members having a pair of opposite resilient ears and the other having a pair of aligned notches adapted to be snapped into engagement with the ears,
(F) the spiral compensating device being arranged generally in a plane normal to the coil axis but coaxial with the filaments,
(G) one end of the compensating device being fixed to said second plate member and the other being removably linked to said lateral arm whereby to rotate said member with change in ambient temperature to change the angular disposition of said pointer.

21. The galvanometer of claim 20 in which the second plate is of horse shoe configuration and has the notches, and the ends of the configuration are adapted to pilot the second plate into engagement with the first plate in a sliding lateral movement toward a condition seating the ear into the notches.

References Cited
UNITED STATES PATENTS

| | | | |
|---|---|---|---|
| 1,288,019 | 12/1918 | Johnson | 324—105 |
| 2,657,358 | 10/1953 | Richardson | 324—154 X |
| 3,090,007 | 5/1963 | Palmer | 324—154 |

GERARD R. STRECKER, Primary Examiner

JERALD J. DEVITT, Assistant Examiner

U.S. Cl. X.R.

324—150 151